United States Patent
Yun

(10) Patent No.: US 11,495,878 B2
(45) Date of Patent: Nov. 8, 2022

(54) MULTIBAND VEHICLE ROOFTOP ANTENNA ASSEMBLY

(71) Applicant: TE Connectivity Services GmbH, Schaffhausen (CH)

(72) Inventor: Xing Yun, Oxford, MI (US)

(73) Assignee: Te Connectivity Solutions GmbH

( * ) Notice: Subject to any disclaimer, the term of this patent is extended or adjusted under 35 U.S.C. 154(b) by 65 days.

(21) Appl. No.: 17/191,123

(22) Filed: Mar. 3, 2021

(65) Prior Publication Data

US 2022/0094044 A1    Mar. 24, 2022

Related U.S. Application Data

(60) Provisional application No. 63/081,366, filed on Sep. 22, 2020.

(51) Int. Cl.
| | |
|---|---|
| *H01Q 9/30* | (2006.01) |
| *H01Q 1/32* | (2006.01) |
| *H01Q 1/52* | (2006.01) |
| *H04L 5/08* | (2006.01) |
| *H01Q 1/42* | (2006.01) |
| *H01Q 21/28* | (2006.01) |

(52) U.S. Cl.
CPC ............ *H01Q 1/3275* (2013.01); *H01Q 1/42* (2013.01); *H01Q 1/521* (2013.01); *H01Q 9/30* (2013.01); *H01Q 21/28* (2013.01); *H04L 5/08* (2013.01)

(58) Field of Classification Search
CPC .......... H01Q 21/28; H01Q 9/30; H01Q 1/521; H01Q 1/42; H01Q 1/3275
See application file for complete search history.

(56) References Cited

U.S. PATENT DOCUMENTS

2015/0071137 A1    3/2015    Thiam et al.

*Primary Examiner* — Graham P Smith

(57) ABSTRACT

A multiband vehicle rooftop antenna assembly includes first and second cellular antenna configured to be operable over one or more cellular frequencies. The multiband vehicle rooftop antenna assembly includes first and second satellite antennas configured to be operable over one or more satellite frequencies including Global Navigation Satellite System (GNSS) signals and satellite digital audio radio services (SDARS) signals. The multiband vehicle rooftop antenna assembly includes a V2X antenna configured to be operable over Dedicated Short Range Communication (DSRC) frequencies. The first satellite antenna is located between the first cellular antenna and the second cellular antenna. The second cellular antenna is located between the first satellite antenna and the second satellite antenna.

31 Claims, 11 Drawing Sheets

MULTIBAND VEHICLE ROOFTOP ANTENNA ASSEMBLY

CROSS-REFERENCE TO RELATED APPLICATIONS

This application claims priority to U.S. Provisional Application No. 63/081,366, filed 22 Sep. 2020, titled "MULTIBAND VEHICLE ROOFTOP ANTENNA ASSEMBLY," which is incorporated by reference herein in its entirety.

BACKGROUND OF THE INVENTION

The subject matter herein relates generally to antenna assemblies.

Various different types of antennas are used in the automotive industry, including AM/FM radio antennas, satellite digital audio radio service antenna, global positioning system antennas, cell phone antennas, and the like. The antenna assembly is operable for transmitting and/or receiving signals to/from the vehicle. Some known antennas are multiband antennas having multiple antennas to cover and operate at multiple frequency ranges. Automotive antennas may be installed or mounted on a vehicle surface, such as the roof, trunk, or hood of the vehicle to help ensure that the antennas have unobstructed views overhead or toward the zenith. The antenna may be connected via a coaxial cable to one or more electronic devices, such as a radio receiver, a touchscreen display, a navigation device, a cellular phone, an autonomous driving system, and the like. However, it is desirable that the cover or radome of the antenna assembly be aerodynamic and stylish. Thus, the dimensions of the antenna assembly are relatively small, leaving very little room for the antenna elements within the interior enclosure of the radome. The antenna elements must be sized to fit within the radome, making transmitting/receiving in some frequency bands difficult. Additionally, closely positioning of the antenna elements within the radome leads to interference and reductions in antenna performance.

A need remains for an antenna assembly conformable to a rooftop antenna profile that is operable in multiple frequency bands.

BRIEF DESCRIPTION OF THE INVENTION

In one embodiment, a multiband vehicle rooftop antenna assembly for installation to a rooftop of a vehicle is provided. The multiband vehicle rooftop antenna assembly includes a first cellular antenna configured to be operable over one or more cellular frequencies. The multiband vehicle rooftop antenna assembly includes a second cellular antenna configured to be operable over one or more cellular frequencies. The multiband vehicle rooftop antenna assembly includes a first satellite antenna configured to be operable over one or more satellite frequencies. The first satellite antenna is configured to be operable for receiving Global Navigation Satellite System (GNSS) signals. The multiband vehicle rooftop antenna assembly includes a second satellite antenna configured to be operable over one or more satellite frequencies. The second satellite antenna is configured to be operable for receiving satellite digital audio radio services (SDARS) signals. The multiband vehicle rooftop antenna assembly includes a V2X antenna configured to be operable over Dedicated Short Range Communication (DSRC) frequencies. The first satellite antenna is located between the first cellular antenna and the second cellular antenna. The second cellular antenna is located between the first satellite antenna and the second satellite antenna.

In another embodiment, a multiband vehicle rooftop antenna assembly for installation to a rooftop of a vehicle is provided. The multiband vehicle rooftop antenna assembly includes an antenna housing has a base and a radome coupled to the base such that an interior enclosure is collectively defined by the radome and the base. The radome has a ridge extending from a nose at a front of the radome to a tip at a rear of the radome. The tip is at an elevated height compared to the nose. The radome has a tail extending between the tip and the base at the rear of the radome. The multiband vehicle rooftop antenna assembly includes a first cellular antenna disposed within the interior enclosure. The first cellular antenna is configured to be operable over one or more cellular frequencies. The multiband vehicle rooftop antenna assembly includes a second cellular antenna disposed within the interior enclosure. The second cellular antenna is configured to be operable over one or more cellular frequencies. The multiband vehicle rooftop antenna assembly includes a first satellite antenna disposed within the interior enclosure. The first satellite antenna is configured to be operable over one or more satellite frequencies. The first satellite antenna is configured to be operable for receiving Global Navigation Satellite System (GNSS) signals. The multiband vehicle rooftop antenna assembly includes a second satellite antenna disposed within the interior enclosure. The second satellite antenna is configured to be operable over one or more satellite frequencies. The second satellite antenna is configured to be operable for receiving satellite digital audio radio services (SDARS) signals. The multiband vehicle rooftop antenna assembly includes a V2X antenna disposed within the interior enclosure. The V2X antenna is configured to be operable over Dedicated Short Range Communication (DSRC) frequencies. The V2X antenna is located at the rear of the antenna housing between the first cellular antenna and the tail. The first cellular antenna forms a rearward facing reflector positioned relative to the V2X antenna to increase gain of the V2X antenna in a generally rearward direction.

In another embodiment, a multiband vehicle rooftop antenna assembly for installation to a rooftop of a vehicle is provided. The multiband vehicle rooftop antenna assembly includes an antenna housing having a base and a radome coupled to the base such that an interior enclosure is collectively defined by the radome and the base. The radome has a ridge extending from a nose at a front of the radome to a tip at a rear of the radome. The tip is at an elevated height compared to the nose. The multiband vehicle rooftop antenna assembly includes a first cellular antenna disposed within the interior enclosure. The first cellular antenna is configured to be operable over one or more cellular frequencies. The multiband vehicle rooftop antenna assembly includes a second cellular antenna disposed within the interior enclosure. The second cellular antenna is configured to be operable over one or more cellular frequencies. The multiband vehicle rooftop antenna assembly includes a first satellite antenna disposed within the interior enclosure. The first satellite antenna is configured to be operable over one or more satellite frequencies. The first satellite antenna is configured to be operable for receiving Global Navigation Satellite System (GNSS) signals. The multiband vehicle rooftop antenna assembly includes a second satellite antenna disposed within the interior enclosure. The second satellite antenna is configured to be operable over one or more satellite frequencies. The second satellite antenna is configured to be operable for receiving satellite digital audio radio services (SDARS) signals. The multiband vehicle rooftop antenna assembly includes a V2X antenna configured to be operable over Dedicated Short Range Communication (DSRC) frequencies. The second cellular antenna is located adjacent the first satellite antenna. The first satellite antenna is right hand circularly polarized and the second cellular antenna is left hand circularly polarized.

DETAILED DESCRIPTION OF THE INVENTION

Figure 1:
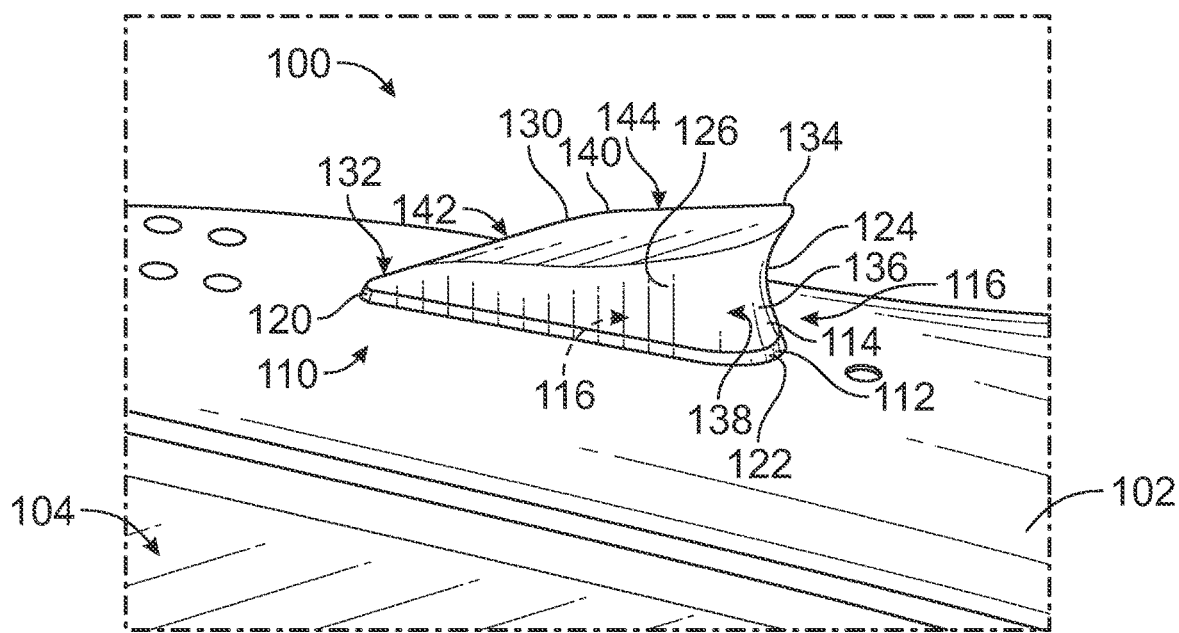
FIG. 1 illustrates a multiband vehicle rooftop antenna assembly in accordance with an exemplary embodiment.

FIG. 1 illustrates a multiband vehicle rooftop antenna assembly 100 in accordance with an exemplary embodiment. The multiband vehicle rooftop antenna assembly 100 is installed on a rooftop 102 of a vehicle 104. The multiband vehicle rooftop antenna assembly 100 may be referred to herein after as antenna assembly 100. The antenna assembly 100 integrates multiple antenna elements into a common structure mounted to the vehicle 104 for a multiband antenna automotive system. For example, the antenna assembly 100 may include Dedicated Short Range Communication (DSRC), cellular, and satellite antennas to provide versatility in communication for the vehicle 104. In an exemplary embodiment, the antenna assembly 100 is operable over DSRC frequencies for "vehicle to everything" communication, operable over one or more cellular frequencies (for example, 5G, Long Term Evolution (LTE), and the like), and operable over one or more satellite signals (e.g., Satellite Digital Audio Radio (SDARS), Global Navigation Satellite System (GNSS), and the like). The antenna assembly 100 may include antenna elements operable in other frequencies, such as Wi-Fi and/or terrestrial frequencies (for example, amplitude modulation (AM), frequency modulation (FM), and the like). The antenna elements of the antenna assembly 100 are arranged so as to avoid (or at least reduce) any interference and/or degradation of signals between the various antenna elements.

The antenna assembly 100 includes an antenna housing 110 holding the antenna components. The antenna housing 110 includes a base 112 and a cover or radome 114 coupled to the base 112. The base 112 and the radome 114 form an interior enclosure 116 that receives the antenna components. Optionally, some antenna components may be located within and/or below the base 112, such as circuit boards, cables, and the like. In an exemplary embodiment, the antenna elements are located above the base 112, under the radome 114, inside the interior enclosure 116. The antenna elements may be mounted to the base 112 and covered by the radome 114.

The radome 114 extends between a front 120 and a rear 122. The radome 114 has a right side 124 and a left side 126 between the front 120 and the rear 122. In an exemplary embodiment, the radome 114 is aerodynamically designed and has a shark-fin shape. The radome 114 has a ridge 130 extending between the front 120 and the rear 122. The ridge 130 extends from a nose 132 at the front 120 to a tip 134 at the rear 122. The radome 114 has a tail 136 at the rear 122 that extends between the tip 134 and the base 112. The tail 136 may include an indent 138 such that the rear 122 is concave shaped.

The tip 134 is at an elevated height compared to the nose 132. For example, the ridge 130 may have an increasing height from the front 120 to the rear 122. In the illustrated embodiment, the nose 132 may have near zero height at the front 120. Optionally, the radome 114 may be tallest at or near the tip 134. In various embodiments, the tip 134 may have a maximum height relative to the rooftop 102 of the vehicle 104 of 70 mm. In an exemplary embodiment, the radome 114 includes a bulge 140 along the ridge 130. The bulge 140 may be approximately centered along the ridge 130 between the front 120 and the rear 122. The ridge 130 includes a front portion 142 forward of the bulge 140 and a rear portion 144 rearward of the bulge 140. The front portion 142 of the ridge 130 is steeper and the rear portion 144 is flatter. For example, the ridge 130 rises quicker at the front to increase the size or volume of the interior enclosure 116 for receiving the antenna elements.

Figure 2:
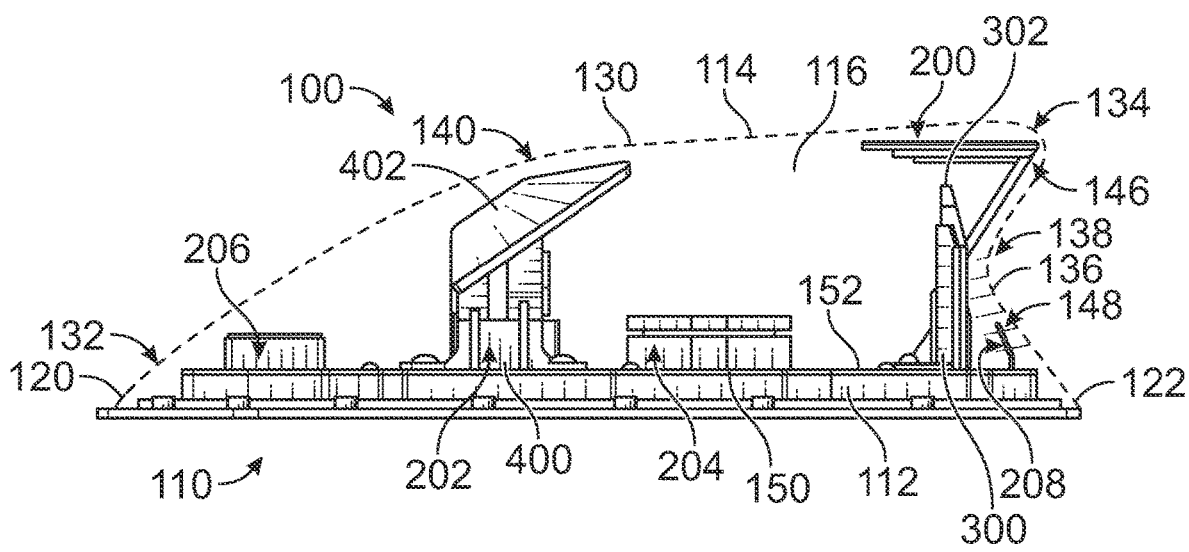
FIG. 2 is a side, partial section view of the antenna assembly illustrating components of the antenna assembly in accordance with an exemplary embodiment.

FIG. 2 is a side, partial section view of the antenna assembly 100 illustrating components of the antenna assembly 100. The antenna assembly 100 includes the antenna housing 110 with antenna elements in the interior enclosure 116. The antenna elements are coupled to the base 112. The radome 114 covers the antenna elements in the interior enclosure 116. In an exemplary embodiment, the antenna assembly 100 includes one or more circuit boards 150 at the base 112. The circuit board 150 includes a ground plane 152 to provide a ground reference from the antenna elements. The circuit board 150 may include feed circuits to feed the antenna elements. For example, the antenna elements may be soldered to circuits or conductors of the circuit board 150. Alternatively, the feeds for the antenna elements may be provided by cables.

In an exemplary embodiment, the antenna assembly 100 includes a first or primary cellular antenna 200 configured to be operable over one or more cellular frequencies, a second or secondary cellular antenna 202 configured to be operable over one or more cellular frequencies, a first satellite antenna 204 configured to be operable over one or more satellite frequencies, a second satellite antenna 206 configured to be operable over one or more satellite frequencies, and a V2X antenna 208 configured to be operable over Dedicated Short Range Communication (DSRC) frequencies. The antennas 200, 202, 204, 206, 208 are mounted to the base 112. In an exemplary embodiment, the first and second cellular antennas 200, 202 are monopole antennas. The first and second satellite antennas 204, 206 are patch antennas. The V2X antenna 208 may be a monopole antenna.

In an exemplary embodiment, the first and second cellular antennas 200, 202 cover a broad frequency range to meet bandwidth requirements of the 5G cellular network. For example, the first and second cellular antennas 200, 202 may cover a frequency range from approximately 617 MHz to 5 GHz. In an exemplary embodiment, the first satellite antenna 204 is used for satellite positioning, such as for use with a GPS system of the vehicle. The first satellite antenna 204 may be a dual band (L1 and L5) antenna element. The first satellite antenna 204 may have a low axial ratio to provide high precision positioning for assisted driving and self-driving. In an exemplary embodiment, the second satellite antenna 206 is used for satellite radio. In an exemplary embodiment, the V2X antenna 208 is used for communication with the surroundings, such as vehicle-to-vehicle communication, vehicle-to-infrastructure communication, vehicle-to-pedestrian communication, and the like.

The first cellular antenna 200 is configured to be operable for receiving and/or transmitting communication signals within one or more cellular frequency bands (for example, 5G, Long Term Evolution (LTE), and the like). In an exemplary embodiment, the first cellular antenna 200 includes a dielectric support 300 and an antenna element 302 coupled to the dielectric support 300. The dielectric support is coupled to the base 112. The dielectric support 300 may be coupled to the circuit board 150. In various embodiments, the antenna element 302 may be a stamped and formed part coupled to the dielectric support 300. For example, the dielectric support 300 has a preformed shape and the antenna element 302 has a complimentary shape. In other various embodiments, the antenna element 302 may be formed directly on the dielectric support 300, such as being printed or coated onto surfaces of the dielectric support 300. In other alternative embodiments, the first cellular antenna 200 is provided without the dielectric support 300, such as having a stamped and formed conductor structure that is self-supporting and free-standing. In an exemplary embodiment, the first cellular antenna 200 is generally at the rear 122 of the antenna housing 110. The first cellular antenna 200 may be located generally under the tip 134, which is the tallest part of the antenna assembly 100 to allow maximum length of the antenna element of the first cellular antenna 200. The shape of the first cellular antenna 200 may accommodate the indent 138 of the radome 114, such as extending at least partially into an upper pocket 146 above the indent 138 and/or at least partially into a lower pocket 148 below the indent 138.

The second cellular antenna 202 is configured to be operable for receiving and/or transmitting communication signals within one or more cellular frequency bands (for example, 5G, Long Term Evolution (LTE), and the like). In an exemplary embodiment, the second cellular antenna 202 includes a dielectric support 400 and an antenna element 402 coupled to the dielectric support 400. The dielectric support is coupled to the base 112. The dielectric support 400 may be coupled to the circuit board 150. In various embodiments, the antenna element 402 may be a stamped and formed part coupled to the dielectric support 400. For example, the dielectric support 400 has a preformed shape and the antenna element 402 has a complimentary shape. In other various embodiments, the antenna element 402 may be formed directly on the dielectric support 400, such as being printed or coated onto surfaces of the dielectric support 400. In other alternative embodiments, the second cellular antenna 202 is provided without the dielectric support 400, such as having a stamped and formed conductor structure that is self-supporting and free-standing. In an exemplary embodiment, the second cellular antenna 202 is generally centered within the antenna housing 110. The second cellular antenna 202 may be located generally under the bulge 140, such as to allow sufficient height for the second cellular antenna 202 compared to locating proximate to the nose 132. The shape of the second cellular antenna 202 may accommodate the ridge 130 of the radome 114, such as having a portion extending forward of the bulge 140 and a portion extending rearward of the bulge 140.

The first satellite antenna 204 is configured to be operable for receiving Global Navigation Satellite System (GNSS) signals. The second satellite antenna 206 is configured to be operable for receiving satellite digital audio radio services (SDARS) signals (for example, Sirius XM, Telematics Control Unit (TCU), and the like). The first and second satellite antennas 204, 206 may be mounted to the base 112 and/or the circuit board 150. In an exemplary embodiment, the first satellite antenna 204 is generally centered within the antenna housing 110 and the second satellite antenna 206 is located generally the front 120 of the antenna housing 110, such as proximate to the nose 132.

In an exemplary embodiment, the V2X antenna 208 transmits and/or receives DSRC signals for communication with surrounding or interacting with other vehicles, pedestrians, roadway infrastructure or other networks. In an exemplary embodiment, the V2X antenna 208 is a monopole antenna configured to transmit and receive signals omnidirectionally. In various embodiments, the V2X antenna 208 may be rearward facing for communicating primarily in the rearward direction. In an exemplary embodiment, the V2X antenna 208 is generally at the rear 122 of the antenna housing 110, such as in the lower pocket 148 below the indent 138. The V2X antenna 208 is shaped to fit in the interior enclosure 116 of the radome 114. For example, the height of the V2X antenna 208 may be limited to fit in the lower pocket 148 under the indent 138. In an exemplary embodiment, the V2X antenna 208 is bent forwardly to conform to the shape of the tail 136, such as to allow increased length of the V2X antenna 208 as compared to if the V2X antenna 208 extended perpendicular to the ground plane 152.

Figure 3:
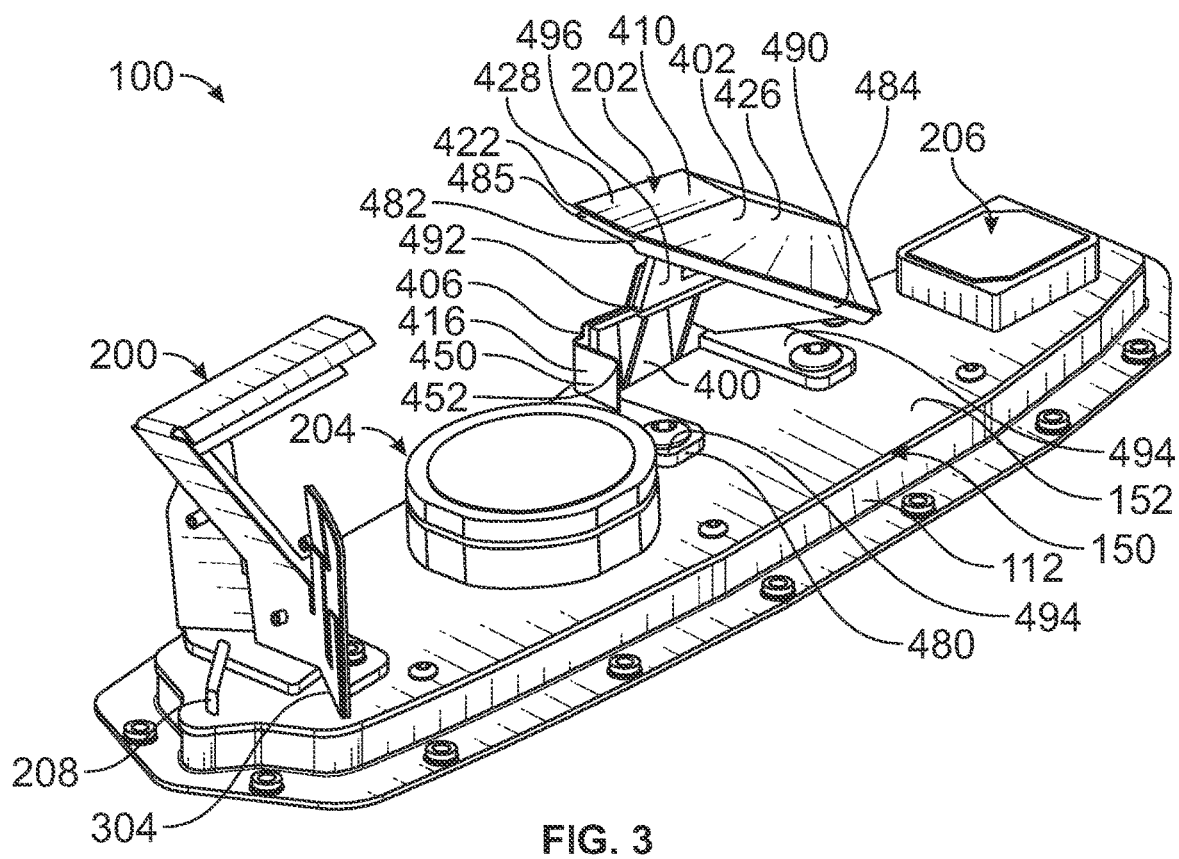
FIG. 3 is a rear perspective view of the right side a portion of the antenna assembly in accordance with an exemplary embodiment.
Figure 4:
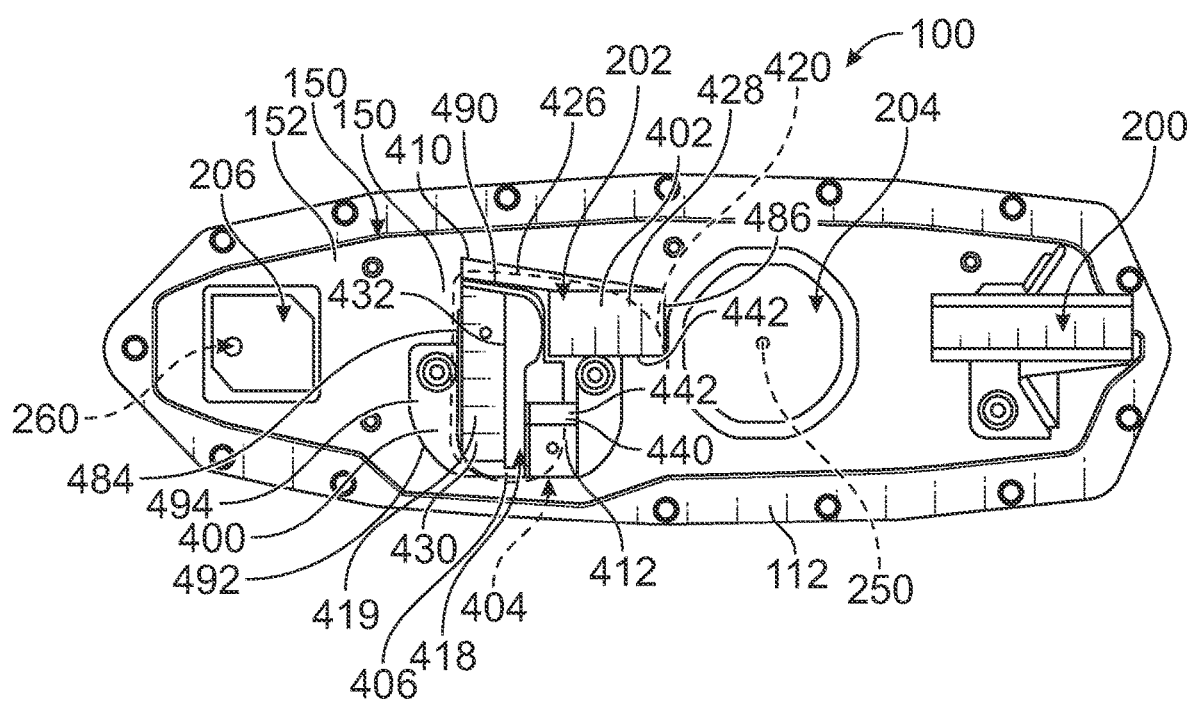
FIG. 4 is a top view of a portion of the antenna assembly in accordance with an exemplary embodiment.
Figure 5:
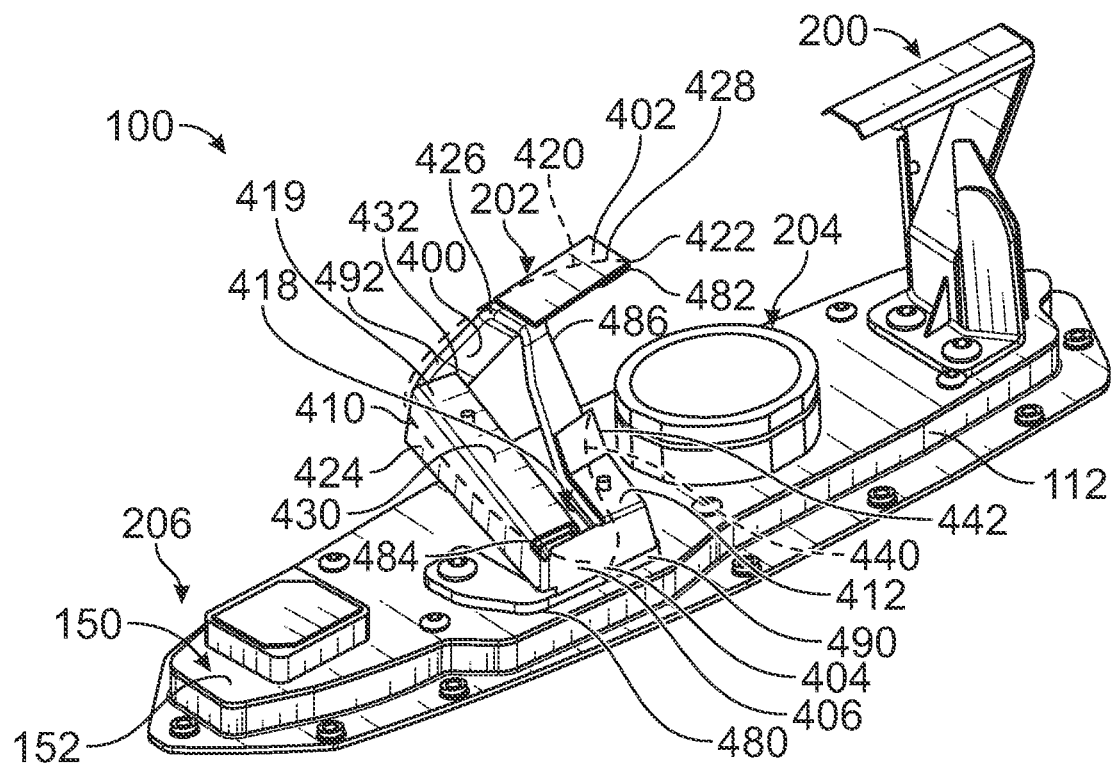
FIG. 5 is a front perspective view of the left side a portion of the antenna assembly in accordance with an exemplary embodiment.
Figure 6:
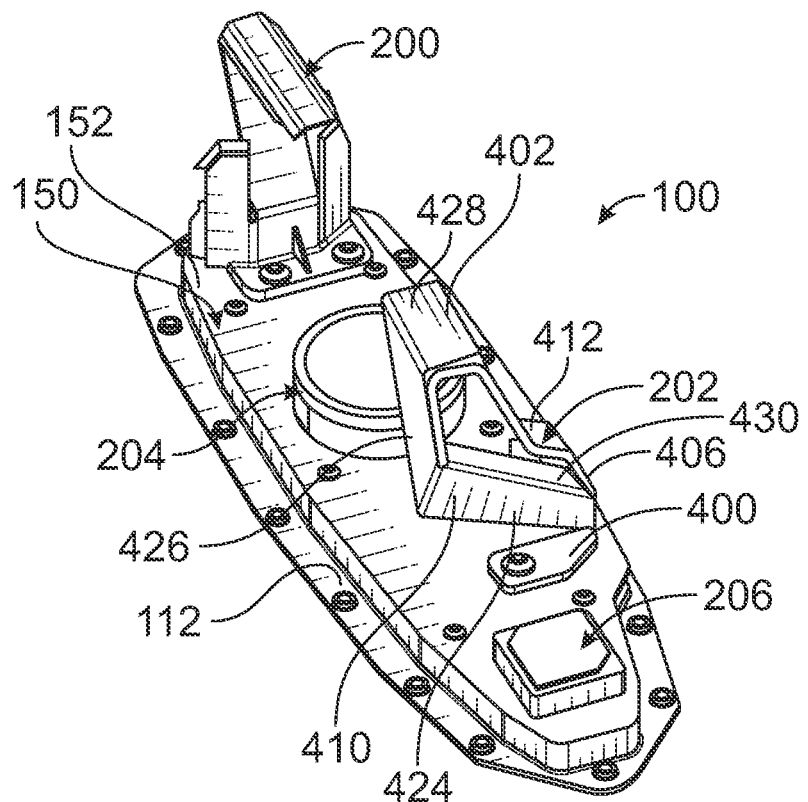
FIG. 6 is a front perspective view of the right side a portion of the antenna assembly in accordance with an exemplary embodiment.

FIG. 3 is a rear perspective view of the right side a portion of the antenna assembly 100 in accordance with an exemplary embodiment. FIG. 4 is a top view of a portion of the antenna assembly 100 in accordance with an exemplary embodiment. FIG. 5 is a front perspective view of the left side a portion of the antenna assembly 100 in accordance with an exemplary embodiment. FIG. 6 is a front perspective view of the right side a portion of the antenna assembly 100 in accordance with an exemplary embodiment. The radome 114 (shown in FIG. 1) is removed for clarity.

The antenna assembly 100 includes the first cellular antenna 200, the second cellular antenna 202, the first satellite antenna 204, the second satellite antenna 206, and the V2X antenna 208. In an exemplary embodiment, the base 112 of the antenna assembly 100 has a relatively small footprint and the antenna elements are positioned in close proximity to each other to fit within the footprint. The antenna elements are positioned relative to each other such that there is sufficient de-correlation, sufficiently low coupling, and sufficient isolation between the antenna elements. The antenna elements are positioned relative to each other to fit within the radome 114 (for example, within the shark-fin shape of the radome 114). For example, placement of the antenna elements is positioned based on height, width, and length dimensions of the antenna elements to fit within the interior enclosure of the radome 114. In an exemplary embodiment, the V2X antenna 208 is positioned rearward of the first cellular antenna 200; the first cellular antenna 200 is positioned rearward of the first satellite antenna 204; the first satellite antenna 204 is positioned rearward of the second cellular antenna 202; and the second cellular antenna 202 is positioned rearward of the second satellite antenna 206. In the illustrated embodiment, the antenna elements are arranged from front to rear in the order of the second satellite antenna 206, the second cellular antenna 202, the first satellite antenna 204, the first cellular antenna 200, and the V2X antenna 208.

In an exemplary embodiment, the first and second cellular antennas 200, 202 are multiple-in, multiple-out (MIMO) antenna elements that cover four wide frequency bands. For example, the first and second cellular antennas 200, 202 are designed to operate in low-band frequencies (for example, 617 MHz-960 MHz); mid-band frequencies (for example, 1.7 GHz-2.2 GHz); high band frequencies (for example, 2.2 GHz-2.7 GHz); and ultra-high-band frequencies (for example, 3.3 GHz-5.0 GHz). The first and second cellular antennas 200, 202 may be designed to operate at other frequency ranges or in other frequency bands. In an exemplary embodiment, the V2X antenna 208 is a single band, monopole antenna designed to operate in a frequency range of between 5855-5925 MHz. The V2X antenna 208 may be designed to operate at other frequency ranges, such as Bluetooth Low Energy 2.4 GHz-2.48 GHz.

Figure 7:
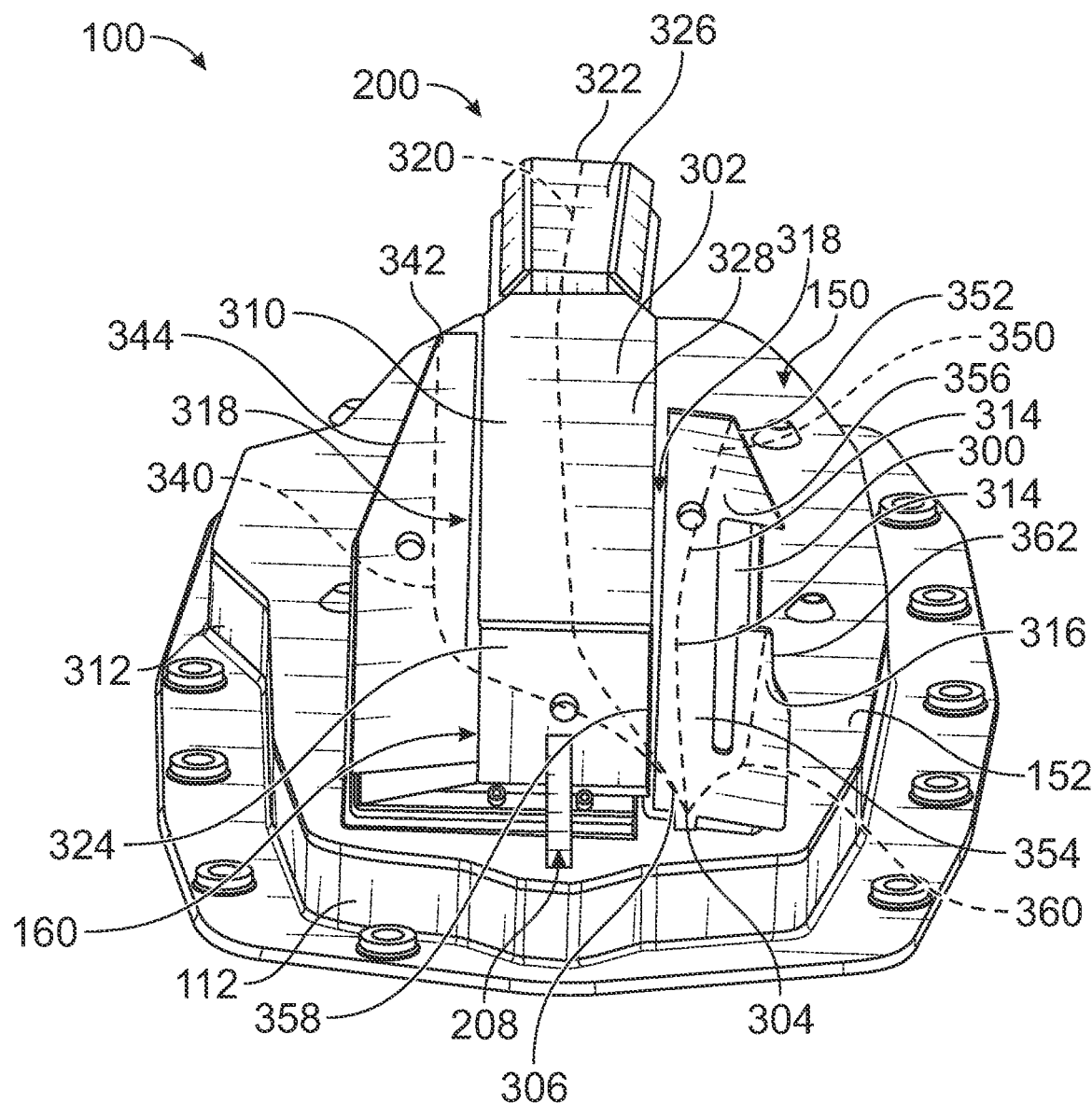
FIG. 7 is a rear view of a portion of the antenna assembly showing the first cellular antenna and the V2X antenna in accordance with an exemplary embodiment.
Figure 8:
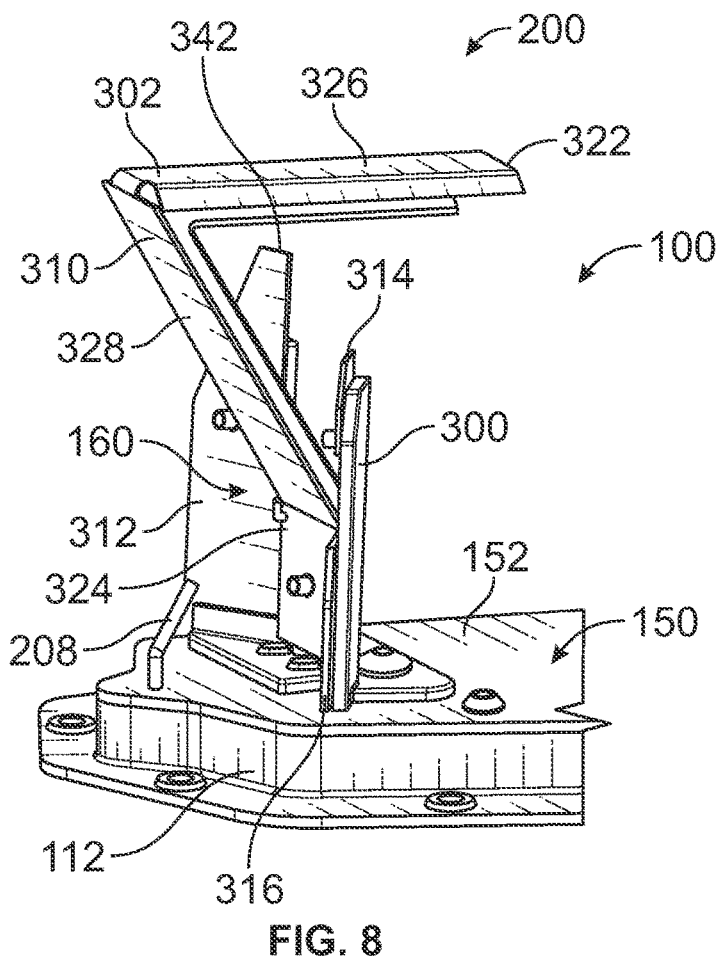
FIG. 8 is a rear perspective view of a portion of the antenna assembly showing the first cellular antenna and the V2X antenna in accordance with an exemplary embodiment.

FIG. 7 is a rear view of a portion of the antenna assembly 100 showing the first cellular antenna 200 and the V2X antenna 208 in accordance with an exemplary embodiment. FIG. 8 is a rear perspective view of a portion of the antenna assembly 100 showing the first cellular antenna 200 and the V2X antenna 208 in accordance with an exemplary embodiment. The V2X antenna 208 is located rearward of the first cellular antenna 200. In an exemplary embodiment, the first cellular antenna 200 forms a reflector 160 for the V2X antenna 208 located forward of the V2X antenna 208 to create strong signal coverage in the car rear direction, such as to create a strong communication link with vehicles located behind the vehicle. The V2X antenna 208 and/or the reflector 160 may be located at other locations to have signal coverage in other directions, such as forward or to the sides of the vehicle. In other various embodiments, the V2X antenna 208 may be omni-directional having 360° signal coverage.

The first cellular antenna 200 includes the dielectric support 300 and the antenna element 302 coupled to the dielectric support 300. The dielectric support 300 supports the shape of the antenna element 302. The dielectric support 300 provides a mounting interface to the circuit board 150. In an exemplary embodiment, the antenna element 302 is isolated from the ground plane 152, such as by the dielectric support 300. The antenna element 302 includes a feed 304 and a base 306 extending from the feed 304. The feed 304 is coupled to a feed circuit of the circuit board 150 or to a feed cable or other feed signal conductor, which may be included in the base 112. The feed 304 may be a press fit pin, a solder tail, a solder pad, a crimp barrel, and the like.

In an exemplary embodiment, the first cellular antenna 200 includes multiple branches provided to cover different frequency bands. For example, the first cellular antenna 200 includes a first branch 310 extending from the base 306, second branch 312 extending from the base 306, a third branch 314 extending from the base 306, and a fourth branch 316 extending from the base 306. The branches 310, 312, 314, 316 are separated by gaps 318 to isolate the branches 310, 312, 314, 316. The first branch 310 defines a low-band radiator operating in the low-band frequencies (for example, 617 MHz-960 MHz). The second branch 312 defines a mid-band radiator operating at mid-band frequencies (for example, 1.7 GHz-2.2 GHz) above the low-band frequencies. The third branch 314 defines a high-band radiator operating at high-band frequencies (for example, 2.2 GHz-2.7 GHz) above the mid-band frequencies. The fourth branch 316 defines an ultra-high-band radiator operating at ultra-high-band frequencies (for example, 3.3 GHz-5.0 GHz) above the high-band frequencies.

The first branch 310 has a first length 320 (shown schematically by the dashed line) from the feed 304 to a first branch tip 322, which may be the furthest point of the first branch 310 from the feed 304. The first branch 310 includes a bottom portion 324, a top portion 326, and an intermediate portion 328 between the bottom portion 324 and the top portion 326. The portions 324, 326, 328 are non-parallel to each other. For example, the first branch 310 includes bends between the portions 324, 326, 328 to change angles or directions of the various portions 324, 326, 328. For example, the antenna element 302 is stamped and formed with the bends to form the portions 324, 326, 328. The portions 324, 326, 328 are supported by the dielectric support 300. In an exemplary embodiment, the bottom portion 324 extends generally perpendicular to the ground plane 152. For example, the bottom portion 324 may extend generally vertically. In an exemplary embodiment, the top portion 326 extends generally parallel to the ground plane 152. For example, the top portion 326 may extend generally horizontally. For example, the top portion 326 may extend along the ridge 130 (shown in FIG. 2) of the radome 114. The top portion 326 may have flared edges along the sides thereof, such as to conform to the shape of the radome 114 along the sides of the radome 114. The top portion 326 extends generally forwardly from the intermediate portion 328. The intermediate portion 328 is angled relative to the top portion 326 and the bottom portion 324. The intermediate portion 328 is non-parallel to the bottom portion 324 and non-parallel to the top portion 326. In the illustrated embodiment, the intermediate portion 328 may be angled at approximately 45°. The intermediate portion 328 may be at other angles in alternative embodiments. The intermediate portion 328 may be angled to face the V2X antenna 208, such as to form part of the reflector 160. In an exemplary embodiment, the intermediate portion 328 extends generally rearwardly and upwardly from the bottom portion 324. The intermediate portion 328 may extend over the V2X antenna 208 in various embodiments. The intermediate portion 328 may be shaped to extend into the upper pocket 146 (shown in FIG. 2) of the radome 114, such as to position the intersection between the intermediate portion 328 and the top portion 326 generally at the tip 134 (shown in FIG. 2) of the radome 114. The first branch 310 may have other sizes and shapes in alternative embodiments. The size/shape/length of the first branch 310 is designed to be the main radiator of the low-band frequencies.

The second branch 312 is located at the left side of the first branch 310. The second branch 312 has a second length 340 (shown schematically by the dashed line) from the feed 304 to a second branch tip 342, which may be the furthest point of the second branch 312 from the feed 304. The second length 340 is shorter than the first length 320. In an exemplary embodiment, the second branch 312 includes an inclined edge 344, which narrows the upper end of the second branch 312, such as to conform to the shape of the radome 114. For example, the inclined edge 344 allows the second branch 312 to be taller, and thus longer, while still conforming to the shape of the radome 114 and fit in the interior enclosure defined by the radome 114. The second branch 312 is separated from the first branch 310 by the gap 318. In an exemplary embodiment, the second branch 312 is connected to the first branch 310 at a seam 348. The antenna element 302 may be bent at the seam 348 such that the second branch 312 is angled relative to the first branch 310. In the illustrated embodiment, the second branch 312 is angled non-parallel (for example, non-coplanar) with respect to the first branch 310. For example, the second branch 312 may be bent or flared rearwardly. The second branch 312 may be angled to face the V2X antenna 208, such as to form part of the reflector 160. The second branch 312 may have other sizes and shapes in alternative embodiments. The size/shape/length of the second branch 312 is designed to be the main radiator of the mid-band frequencies.

The third branch 314 is located at the right side of the first branch 310. The third branch 314 has a third length 350 (shown schematically by the dashed line) from the feed 304 to a third branch tip 352, which may be the furthest point of the third branch 314 from the feed 304. The third length 350 is shorter than the second length 340. The third branch 314 includes a bottom portion 354 and a top portion 356. The top portion 356 extends across the gap 318 generally above the fourth branch 316. The top portion 356 is wider than the bottom portion 354 to increase the area of the third branch 314 at the top end. In an exemplary embodiment, the third branch 314 is connected to the first branch 310 at a seam 358. The antenna element 302 may be bent at the seam 358 such that the third branch 314 is angled relative to the first branch 310. In the illustrated embodiment, the third branch 314 is angled non-parallel (for example, non-coplanar) with respect to the first branch 310. For example, the third branch 314 may be bent or flared rearwardly. The third branch 314 may be angled to face the V2X antenna 208, such as to form part of the reflector 160. The third branch 314 may have other sizes and shapes in alternative embodiments. The size/shape/length of the first branch 310 is designed to be the main radiator of the high-band frequencies.

The fourth branch 316 is located at the right side of the first branch 310. In the illustrated embodiment, the fourth branch 316 is located under the third branch 314, such as under the top portion 356. The fourth branch 316 has a fourth length 360 (shown schematically by the dashed line) from the feed 304 to a fourth branch tip 362, which may be the furthest point of the fourth branch 316 from the feed 304. The fourth length 360 is less than the third length 350. The fourth branch 316 may be angled to face the V2X antenna 208, such as to form part of the reflector 160. The fourth branch 316 may have other sizes and shapes in alternative embodiments. The size/shape/length of the fourth branch 316 is designed to be the main radiator of the ultra-high-band frequencies.

The V2X antenna 208 is located rearward of the first cellular antenna 200. The first cellular antenna 200 forms the reflector 160 for the V2X antenna 208. The second and third branches 312, 314 are angled to face the V2X antenna 208. The second and third branches 312, 314 have flare angles used to control the radiation gain and/or the beam width in the horizontal plane. The first branch 310 faces the V2X antenna 208. For example, the intermediate portion 328 is angled to face the V2X antenna 208. The intermediate portion 328 has a flare angle used to control the radiation gain and/or the beam width in the vertical plane.

Returning to FIGS. 3-6, the first and second satellite antennas 204, 206 are patch antennas mounted to the circuit board 150. The first satellite antenna 204 may operate in the SXM frequency range, such as between 2320 MHz-2345 MHz. The first and second satellite antennas 204, 206 are unobstructed from above to allow communication in the vertical direction. The first satellite antenna 204 is located forward of the first cellular antenna 200, such as between the first and second cellular antennas 200, 202. Optionally, the first satellite antenna 204 is located further from the first cellular antenna 200 (closer to the second cellular antenna 202) such that the first satellite antenna 204 has less interference with the first cellular antenna 200 (primary cellular antenna). The second satellite antenna 206 is located forward of the second cellular antenna 202. For example, the second satellite antenna 206 may be located as for forward on the base 112 as practical. Optionally, the second satellite antenna 206 is located further from the second cellular antenna 202 than the first satellite antenna 204, such as to reduce interference with the second cellular antenna 202. The first and second satellite antennas 204, 206 may be located at other locations in alternative embodiments. In an exemplary embodiment, the first satellite antenna 204 has a right hand polarization and the second cellular antenna 202, which is located adjacent the first satellite antenna 204, has a stronger left hand polarization component than a right hand polarization component at the satellite antenna's frequency to reduce second cellular antenna 206 impact on the first satellite antenna 204.

The second cellular antenna 202 includes the dielectric support 400 and the antenna element 402 coupled to the dielectric support 400. The dielectric support 400 supports the shape of the antenna element 402. The dielectric support 400 provides a mounting interface to the circuit board 150. In an exemplary embodiment, the antenna element 402 is isolated from the ground plane 152, such as by the dielectric support 400. The antenna element 402 includes a feed 404 and a base 406 extending from the feed 404. In the illustrated embodiment, the feed 404 is provided on the left side of the second cellular antenna 202. The feed 404 is coupled to a feed circuit of the circuit board 150 or to a feed cable or other feed signal conductor, which may be included in the base 112. The feed 404 may be a press fit pin, a solder tail, a solder pad, a crimp barrel, and the like.

The dielectric support 400 includes a bottom side 480, a top side 482, a front side 484, a rear side 486, a right side 490, and a left side 492. The dielectric support 400 may have mounting brackets 494 at the bottom side 480 for mounting the dielectric support 400 to the circuit board 150. The dielectric support 400 includes various support walls 496 at or extending between the various sides. Optionally, openings (for example, cutouts, windows, or other negative space) may be provided between the support walls 496, such as to reduce interference with other antenna elements, such as the first and second satellite antennas 204, 206.

In an exemplary embodiment, the second cellular antenna 202 includes multiple branches provided to cover different frequency bands. For example, the second cellular antenna 202 includes a first branch 410 extending from the base 406 and a second branch 412 extending from the base 406. Additional branches may be provided. For example, a third branch and/or a fourth branch 416, which may extend from the first branch 410 and the second branch 412, respectively and/or may extend from the base 406. The branches 410, 412 are separated by gaps 418 to isolate the branches 410, 412. The first branch 410 defines a low-band radiator operating in the low-band frequencies (for example, 617 MHz-960 MHz). The second branch 412 defines an ultra-high-band radiator operating at ultra-high-band frequencies (for example, 4.3 GHz-5.0 GHz) above the high-band frequencies. The first branch 410 and/or the second branch 412 may define a mid-band radiator operating at mid-band frequencies (for example, 1.7 GHz-2.2 GHz) above the low-band frequencies and a high-band radiator operating at high-band frequencies (for example, 2.2 GHz-2.7 GHz) above the mid-band frequencies. In other various embodiments, the third branch may define the mid-band radiator and the fourth branch 416 may define the high-band radiator.

The first branch 410 has a first length 420 (shown schematically by the dashed line) from the feed 404 to a first branch tip 422, which may be the furthest point of the first branch 410 from the feed 404. The first branch 410 includes a first portion 424, a second portion 426, and a third portion 428. The first portion 424 extends from the base 406. In the illustrated embodiment, the first portion 424 extends along the front side 484 between the left side 492 and the right side 490. The second portion 426 extends from the first portion 424. In the illustrated embodiment, the second portion 426 is located along the right side 490. The third portion 428 extends from the second portion 426. In the illustrated embodiment, the third portion 428 extends along the top side 482. The portions 424, 426, 428 are non-parallel to each other. For example, the first branch 410 includes bends between the portions 424, 426, 428 to change angles or directions of the various portions 424, 426, 428. The antenna element 402 may be stamped and formed with the bends to form the portions 424, 426, 428. The portions 424, 426, 428 are supported by the dielectric support 400.

In an exemplary embodiment, the first branch 410 forms a curved radiating section. For example, the first branch 410 follows a generally spiral-shaped, left-hand polarized path from the base 406 to the first branch tip 422 along the first portion 424, the second portion 426, and the third portion 428. In the illustrated embodiment, the first branch 410 extends from the base 406, at the left side 492, along the front side 484, thence along the right side 490, thence along the top side 482. The first branch 410 is left-hand polarized at the first satellite antenna's frequency to reduce interference with the right-hand polarized first satellite antenna 204.

The spiral shape of the first branch 410 increases overall length of the antenna element within a given height constraint of the radome 114, such as to radiate efficiently at the low band frequencies. The first branch 410 rotates, rises and extends to the first branch tip 422.

In an exemplary embodiment, the base 406 extends generally perpendicular to the ground plane 152. For example, the base 406 may extend generally vertically. The base 406 extends generally forwardly from the feed 404 to the first portion 424 along the left side 492. The first portion 424 extends generally upwardly from the base 406 to the second portion 426 across the front side 484. The second portion 426 extends generally upwardly and rearwardly from the second portion 426 to the third portion 428 across the right side 490. The third portion 428 extends generally rearwardly along the top side 482 from the second portion 426 to the first branch tip 422. The third portion 428 may extend generally horizontally. For example, the third portion 428 may extend along the ridge 130 (shown in FIG. 2) of the radome 114. The first branch 410 may have other sizes and shapes in alternative embodiments. The size/shape/length of the first branch 410 is designed to be the main radiator of the low-band frequencies. The size/shape/length of the first branch 410 may be designed to be the main radiator of the mid-band frequencies and/or the high band frequencies. For example, the first branch 410 may include a wing or tab 430 extending from the first branch 410. In the illustrated embodiment, the tab 430 extends from the second portion 426. The tab 430 extends to a tab tip 432. The tab 430 may be designed to be the main radiator of the mid-band frequencies and/or the high band frequencies.

The second branch 412 is located at the left side 492 of the first branch 410. The second branch 412 extends from the base 406. The second branch 412 has a second length 440 (shown schematically by the dashed line) from the feed 404 to a second branch tip 442, which may be the furthest point of the second branch 412 from the feed 404. The second length 440 is shorter than the first length 420. In an exemplary embodiment, the second branch 412 is recessed inward toward the middle of the interior enclosure of the radome 114, such as to conform to the shape of the left side of the radome 114. The second branch 412 is separated from the first branch 410 by the gap 418. The second branch 412 may have other sizes and shapes in alternative embodiments. The size/shape/length of the second branch 412 is designed to be the main radiator of the ultra-high-band frequencies. Alternatively, the size/shape/length of the second branch 412 may be designed to be the main radiator of the high-band frequencies and the antenna element 402 may include a side tab 450 (or third branch) extending from the second branch 412 (or extending from the base 406). The side tab 450 extends to a tab tip 452. The side tab 450 may be designed to be the main radiator of the high-band frequencies or the ultra-high-band frequencies.

The antenna elements of the antenna assembly 100 may be configured such that there is sufficient de-correlation, sufficiently low coupling, and sufficient isolation between the antenna elements without appreciably degrading performance of the antenna elements. The first and second cellular antennas 200, 202 are spaced apart from each other by sufficient distance to provide isolation between the first and second cellular antennas 200, 202 to meet performance requirements. In an exemplary embodiment, the feed 404 of the second cellular antenna 202 is located at the left side of the base 112. The feed 304 of the first cellular antenna 200 is located closer to the right side of the base 112, which increases the relative distance between the feed points of the primary and secondary cellular antennas. The first satellite antenna 204 includes a feed 250. Optionally, the feed 250 may be approximately centered at the base of the first satellite element 204. In the illustrated embodiment, the feed 250 is located closer to the feed 404 of the second cellular antenna 202 than the feed 304 of the first cellular antenna 200, such as to reduce interference of the first satellite antenna 204 with the primary cellular antenna 200. The second satellite antenna 206 includes a feed 260. Optionally, the feed 260 may be approximately centered at the base of the second satellite element 206. The feed 260 is located as far forward as practical to fit the second satellite antenna 206 in the interior enclosure of the radome 114 to reduce the negative impact that the antenna elements have on each other. In the illustrated embodiment, the feed 260 is located further from the feed 404 of the second cellular antenna 202 than the feed 250 of the first satellite antenna 204, such as to reduce interference of the second satellite antenna 206 with the second cellular antenna 202.

FIGS. 9 through 15 provide analysis results measured for an exemplary antenna assembly. Losses in the performance are kept at a very low level while providing broadband functional bands, such as to satisfy 5G and Satellite coverage for a vehicle. The analysis results shown in FIGS. 9 through 15 are provided for purposes of illustration and not for purposes of limitation. Alternative embodiments of the antenna assembly may be configured differently and have different operational or performance parameters than what is shown in FIGS. 9 through 15.

Figure 9:
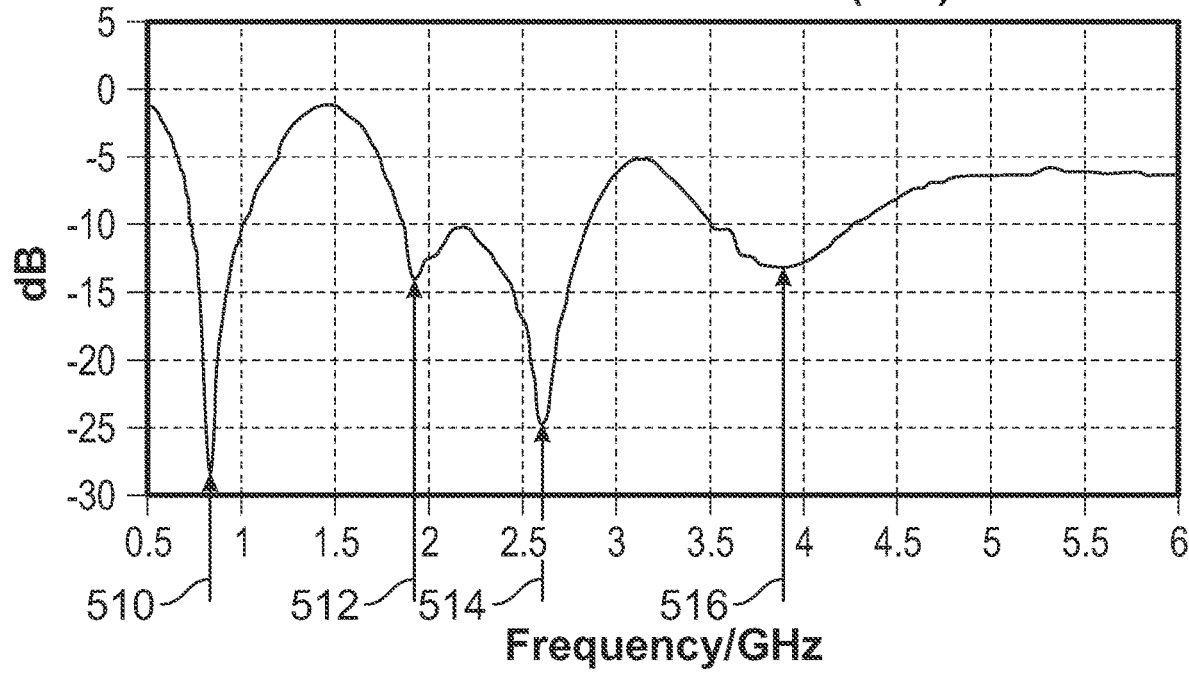
FIG. 9 is a plot showing reflection coefficient (S11) for a primary cellular antenna in decibels versus frequency in gigahertz for the antenna assembly in accordance with an exemplary embodiment.

FIG. 9 is a plot showing impedance matching (S11) for the primary cellular antenna 200 in decibels versus frequency in gigahertz for the antenna assembly 100. The performance of the primary cellular antenna 200 satisfies requirements for a 5G vehicular antenna, such as below −5 dB. Measured reflections 510, 512, 514, 516 associated with the branches 310, 312, 314, 316, respectively, satisfy the requirements for the low-band, the mid-band, the high-band and the ultra-high-band frequencies, respectively.

Figure 10:
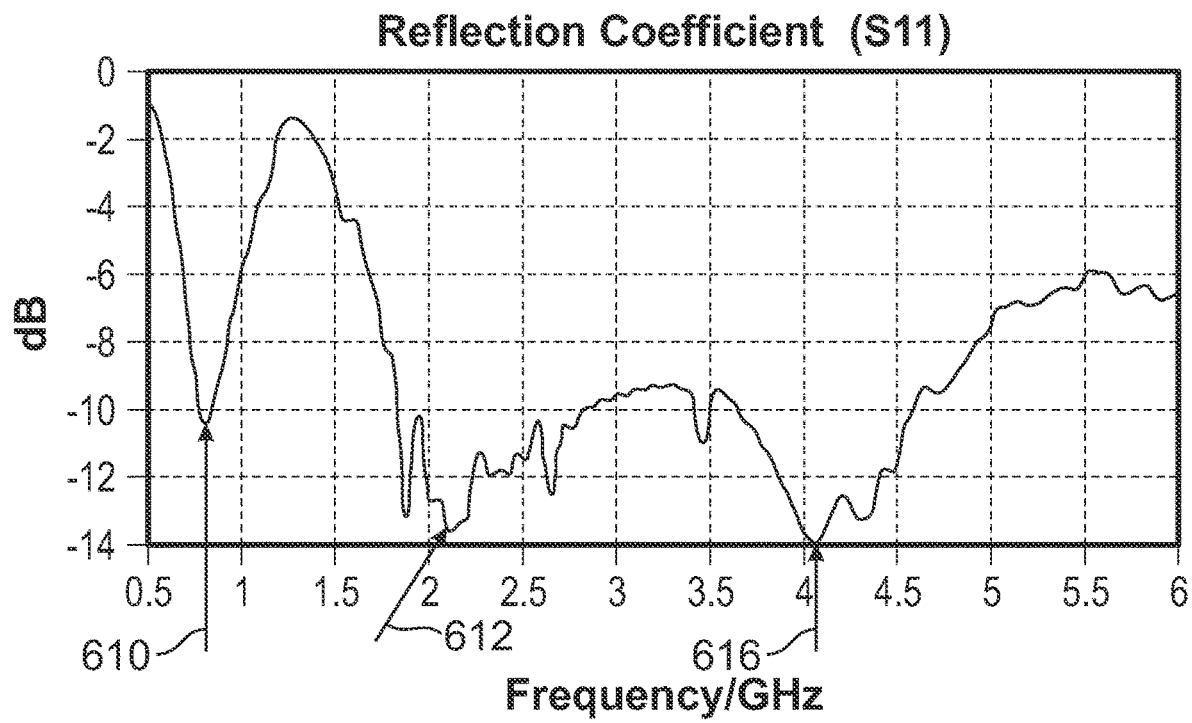
FIG. 10 is a plot showing reflection coefficient (S11) for a secondary cellular antenna in decibels versus frequency in gigahertz for the antenna assembly in accordance with an exemplary embodiment.

FIG. 10 is a plot showing impedance matching (S11) for the secondary cellular antenna 202 in decibels versus frequency in gigahertz for the antenna assembly 100. The performance of the secondary cellular antenna 202 satisfies requirements for a 5G vehicular antenna, such as below −5 dB. Measured reflections 610, 612, 616 satisfy the requirements for the low-band, the mid-band, the high-band and the ultra-high-band frequencies. For example, the measured reflection 610 satisfies the requirements for the low-band; the measured reflection 612 satisfies the requirements for the mid-band and high-band; and the measured reflection 616 satisfies the requirements for the ultra-high-band.

Figure 11:
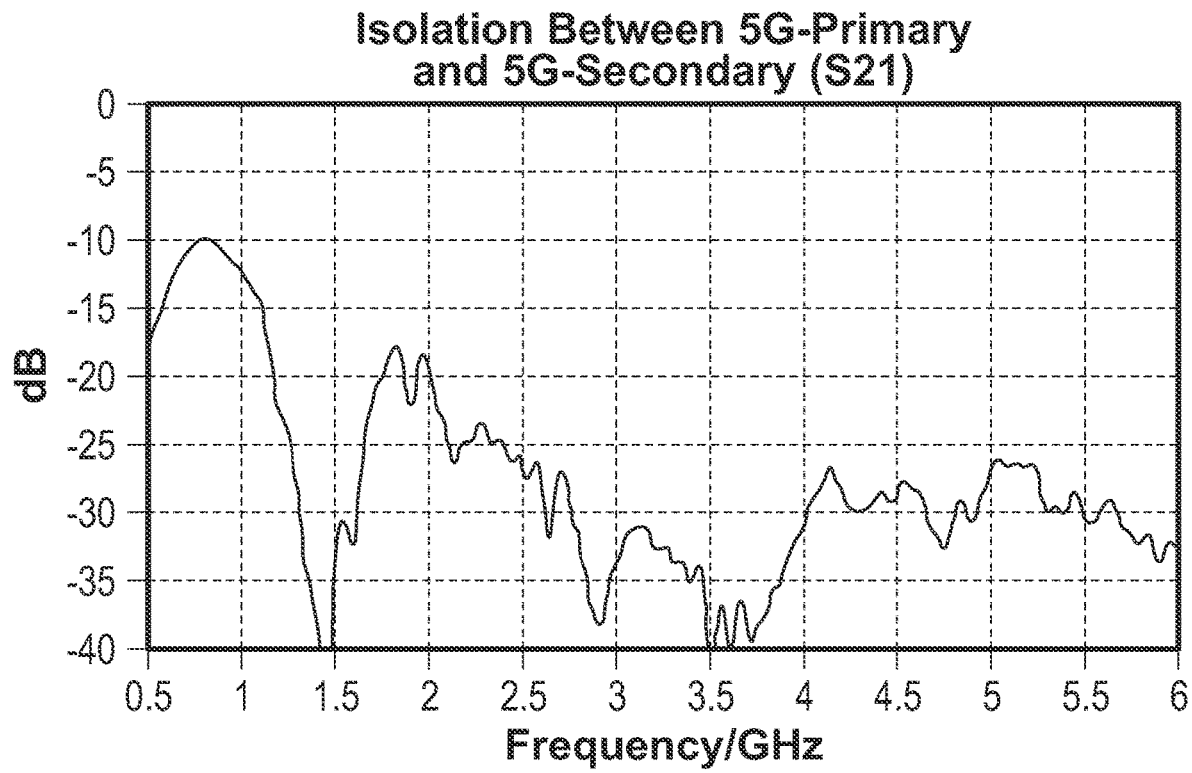
FIG. 11 is a plot showing isolation (S21) for the primary and secondary cellular antennas in decibels versus frequency in gigahertz for the antenna assembly in accordance with an exemplary embodiment.

FIG. 11 is a plot showing isolation (S21) for the primary and secondary cellular antennas 200, 202 in decibels versus frequency in gigahertz for the antenna assembly 100. The performance of the primary and secondary cellular antennas 200, 202 satisfy requirements for a 5G vehicular antenna, such as below −10 dB. For example, the primary and secondary cellular antennas 200, 202 are placed at sufficient distance to ensure isolation between the cellular antennas is below −10 dB. For example, the low-band frequencies are below −10 dB, the mid-band frequencies are below −15 db, the high-band frequencies are below −15 dB and the ultra-high-band frequencies are below −20 dB.

Figure 12:
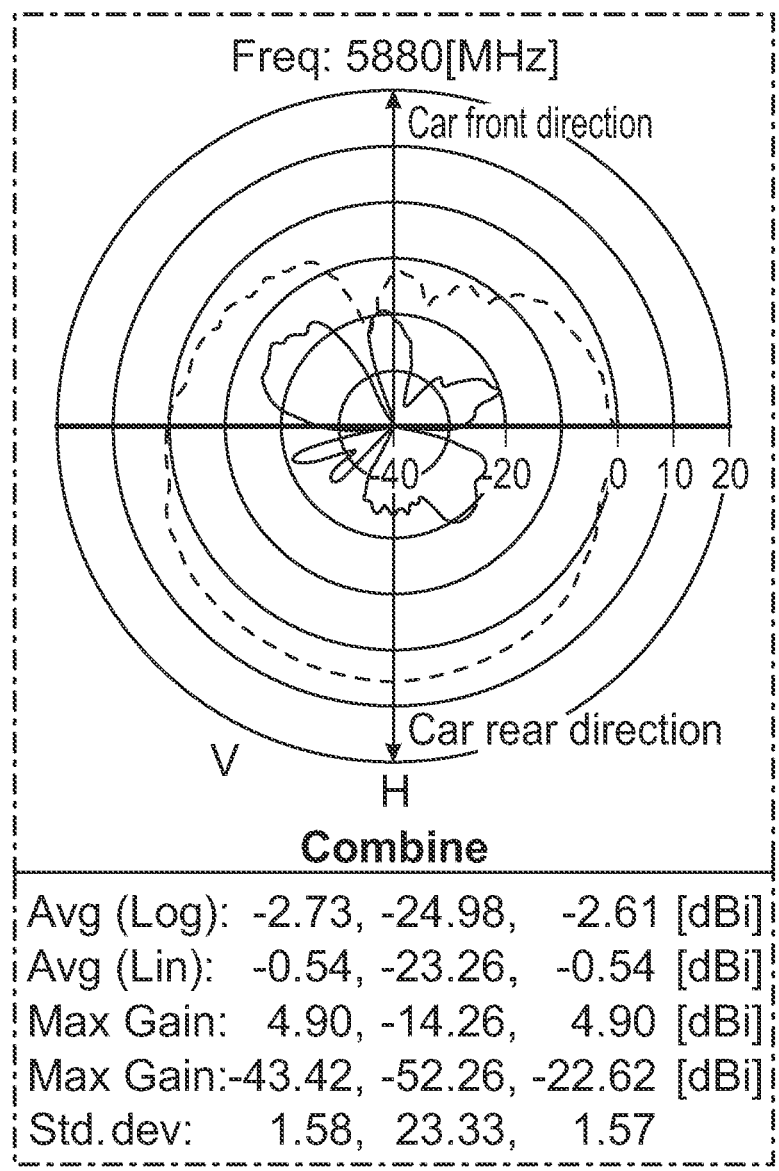
FIG. 12 is a plot showing a directional radiation pattern of a V2X antenna for the antenna assembly in accordance with an exemplary embodiment.

FIG. 12 is a plot showing a directional radiation pattern of the V2X antenna 208 for the antenna assembly 100. The performance of the V2X antenna 208 is enhanced in the rearward direction by the reflector 160 (the primary cellular antenna 202). The plot shows the realized gain of the vertical polarization at 5880 MHz in the elevation angle of 90° plane (parallel to the earth horizontal plane) measured on a 1.0 meter ground plane. The realized gain is highest (4.9 dB) in the car rear direction.

Figure 13:
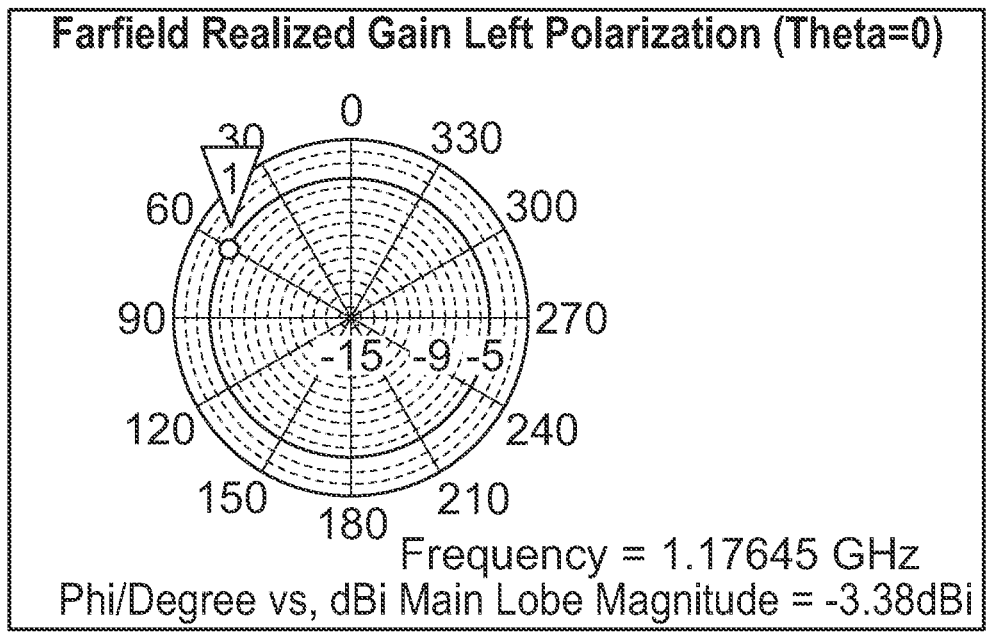
FIG. 13 is a plot showing farfield realized gain for left polarization of the secondary cellular antenna for the antenna assembly in accordance with an exemplary embodiment.
Figure 14:
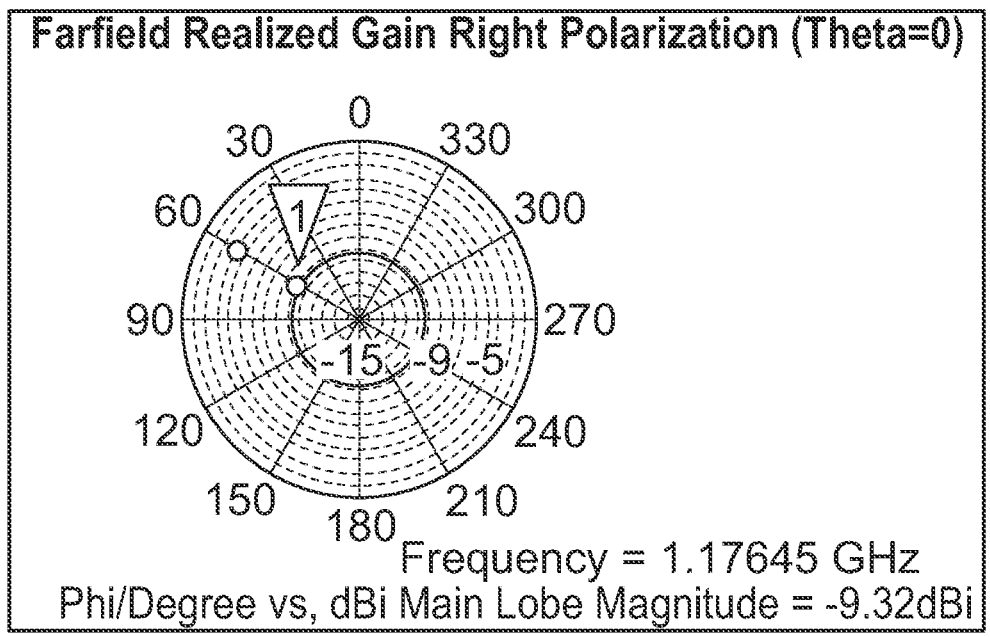
FIG. 14 is a plot showing farfield realized gain for right polarization of the secondary cellular antenna for the antenna assembly in accordance with an exemplary embodiment.

FIG. 13 is a plot showing farfield realized gain at the zenith direction (0°) for the left polarization component of the secondary cellular antenna 202 at GNSS L1 band for the antenna assembly 100. FIG. 14 is a plot showing farfield realized gain at the zenith direction (0°) for the right polarization component of the secondary cellular antenna 202 at GNSS L1 band for the antenna assembly 100. The secondary cellular antenna 202 is strongly left hand polarized. For example, at the zenith direction (0°), the LHCP realized gain of the secondary cellular antenna 202 is approximately 6 dB higher than the RHCP realized gain.

Figure 15:
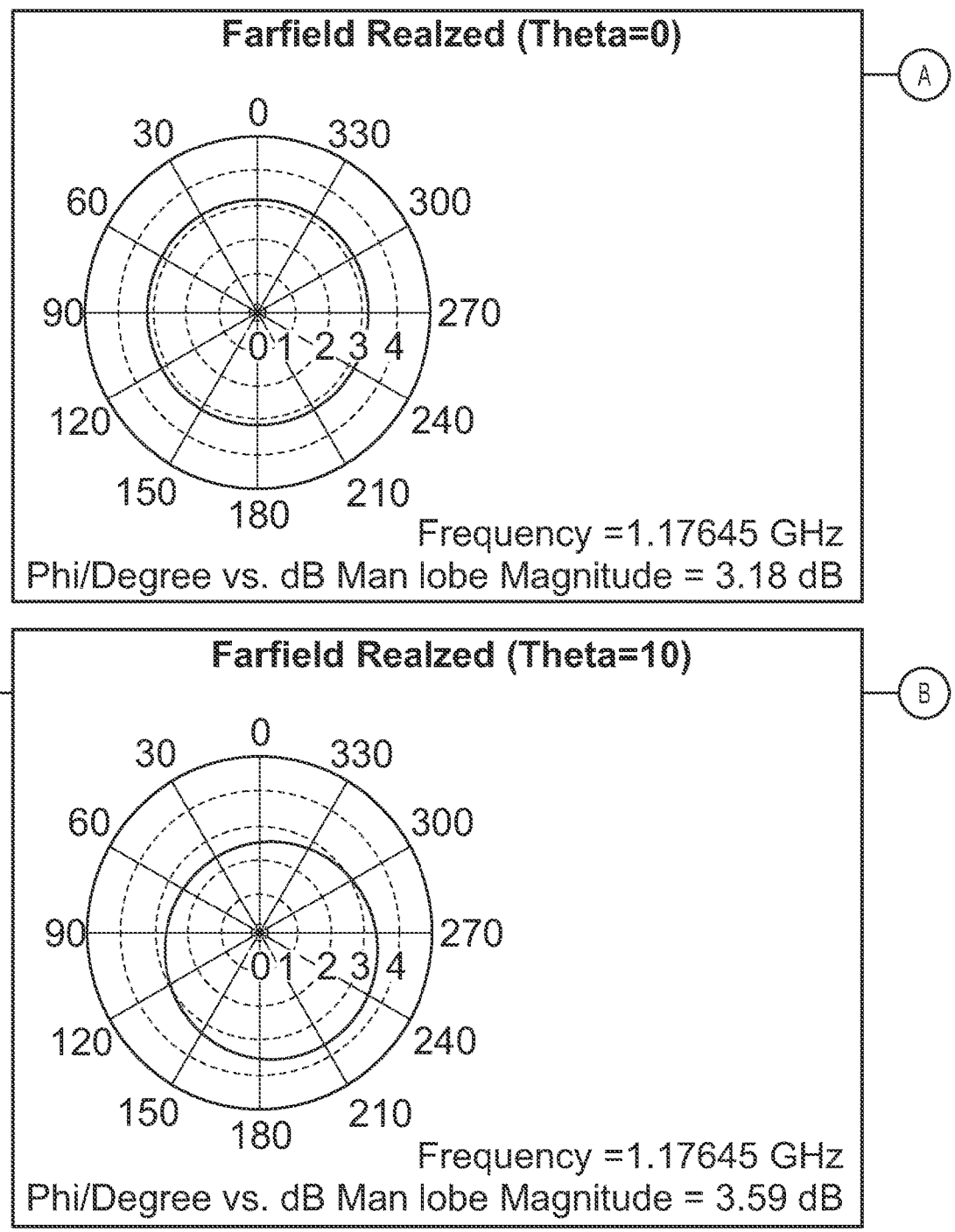
FIG. 15 shows six plots of axial-ratios at different elevation angles (0°, 10°, 20°, 30°, 40° and 50°) for a first satellite antenna for the antenna assembly in accordance with an exemplary embodiment.
Figure 15:
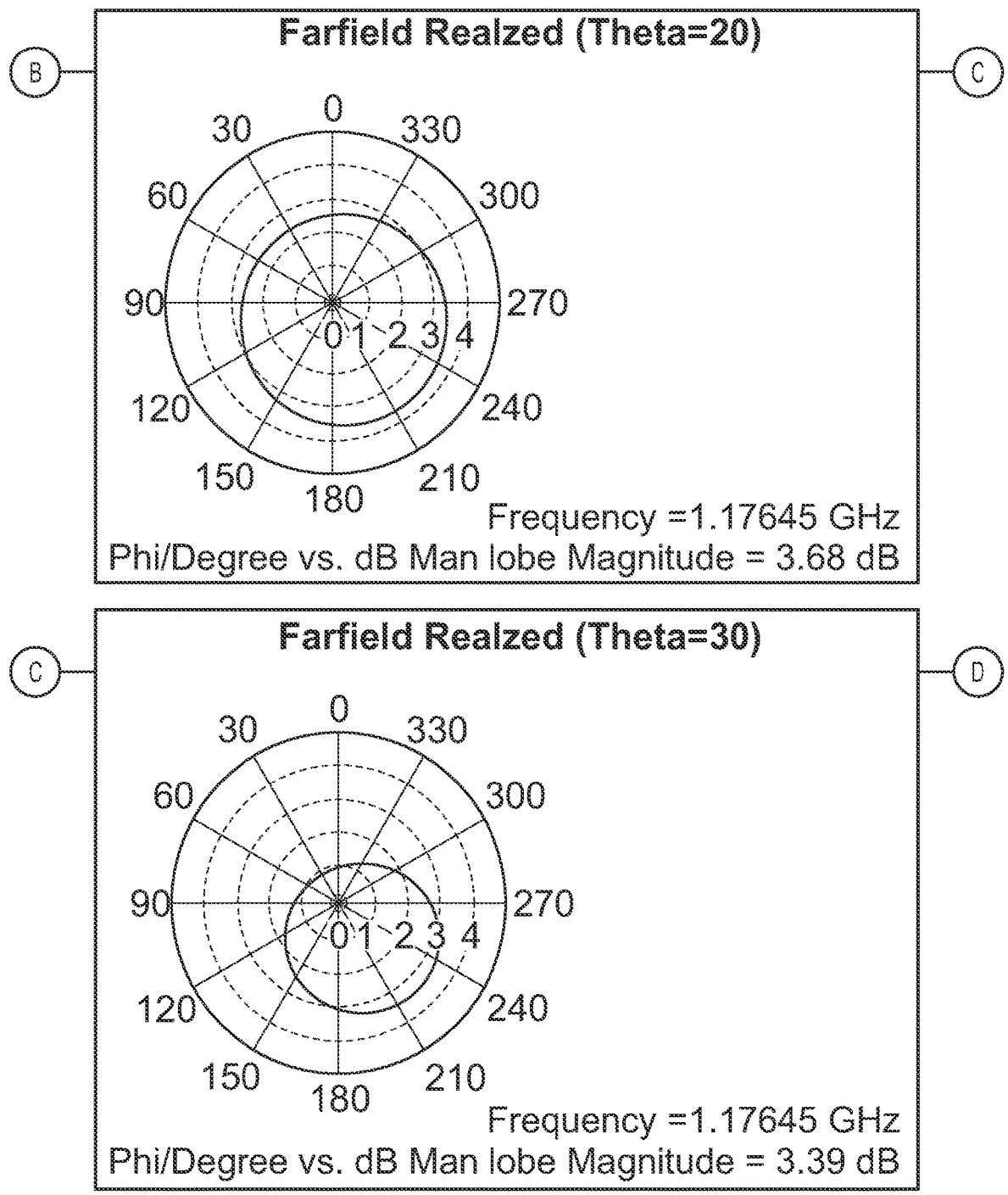
Figure 15:
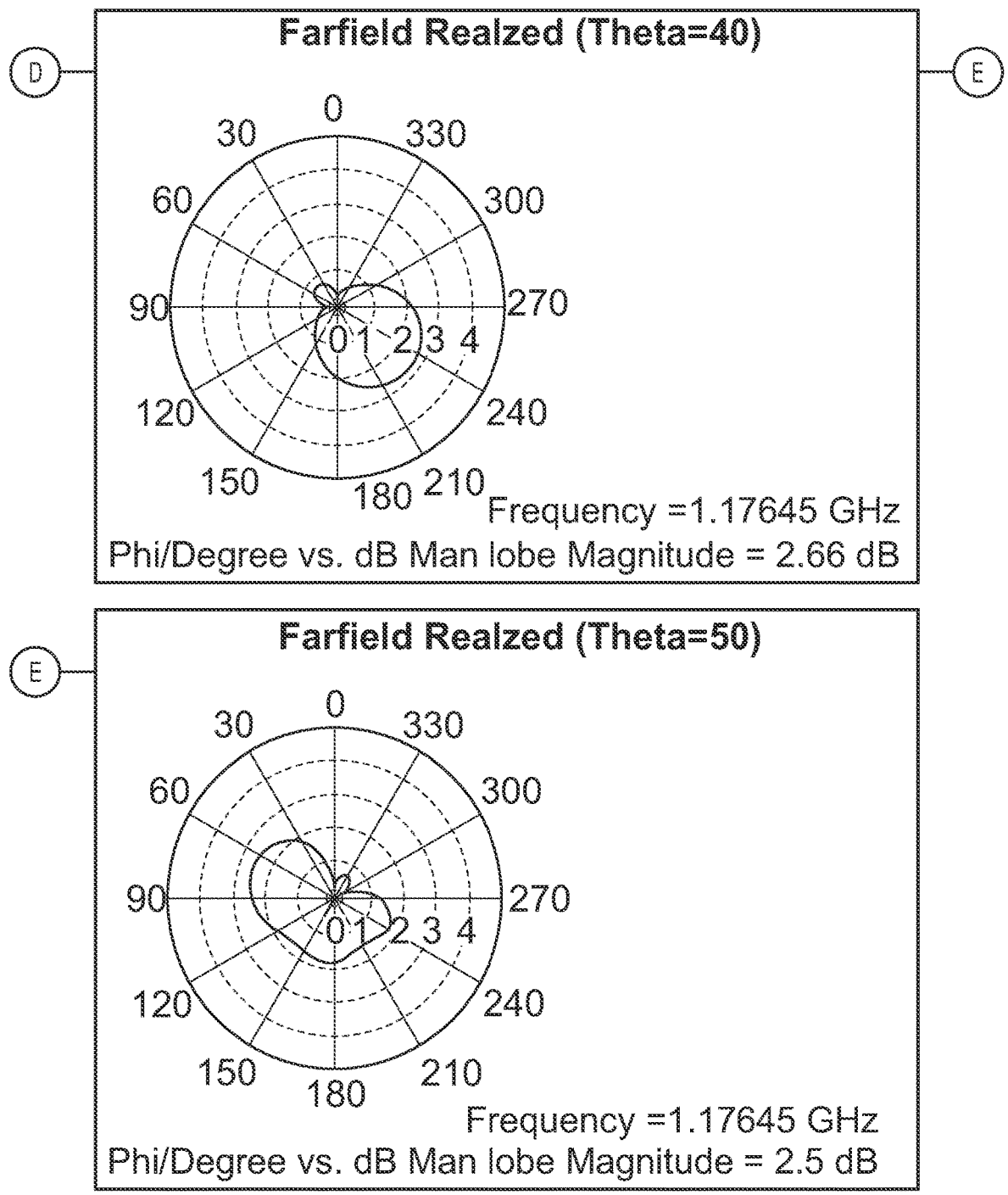

FIG. 15 shows six plots of axial-ratios at different elevation angles (0°, 10°, 20°, 30°, 40° and 50°) for the first satellite antenna 204 for the antenna assembly 100. The axial ratio of the first satellite antenna 204 remains low (for example, lower than 3.6 dB) at 1176 MHz. The low axial ratios (for example, below 5 dB) show that the impact of the second cellular antenna 202 on the first satellite antenna 202 is small due to having different polarizations and within satisfactory performance requirements for the first satellite antenna 204.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A multiband vehicle rooftop antenna assembly for installation to a rooftop of a vehicle, the multiband vehicle rooftop antenna assembly comprising:
    a first cellular antenna configured to be operable over one or more cellular frequencies;
    a second cellular antenna configured to be operable over one or more cellular frequencies;
    a first satellite antenna configured to be operable over one or more satellite frequencies, the first satellite antenna configured to be operable for receiving Global Navigation Satellite System (GNSS) signals;
    a second satellite antenna configured to be operable over one or more satellite frequencies, the second satellite antenna configured to be operable for receiving satellite digital audio radio services (SDARS) signals; and a V2X antenna configured to be operable over Dedicated Short Range Communication (DSRC) frequencies;

wherein the first satellite antenna is located between the first cellular antenna and the second cellular antenna; and wherein the second cellular antenna is located between the first satellite antenna and the second satellite antenna.

2. The multiband vehicle rooftop antenna assembly of claim 1, further comprising an antenna housing having a base and a radome coupled to the base such that an interior enclosure is collectively defined by the radome and the base, the V2X antenna, the first and second cellular antennas, and the first and second satellite antennas are disposed within the interior enclosure.

3. The multiband vehicle rooftop antenna assembly of claim 2, further comprising a circuit board coupled to the base, the circuit board including a ground plane.

4. The multiband vehicle rooftop antenna assembly of claim 2, wherein the radome has a ridge extending from a nose at a front of the radome to a tip at a rear of the radome, the tip being at an elevated height above the nose, wherein the first cellular antenna is located generally at the rear of the radome and extends generally to the tip of the radome.

5. The multiband vehicle rooftop antenna assembly of claim 4, wherein the radome includes a tail at the rear of the radome, the tail being concave having an indent extending into the interior enclosure to form an upper pocket and a lower pocket, the first cellular antenna extending into the upper pocket above the indent, the V2X antenna located below the indent in the lower pocket.

6. The multiband vehicle rooftop antenna assembly of claim 4, wherein the ridge of the radome includes a bulge, the ridge being steeper forward of the bulge to the nose and flatter rearward of the bulge to the tip, the tip being elevated higher than the bulge, the first cellular antenna being generally aligned with the tip, the second cellular antenna being generally aligned with the bulge with a portion of the second cellular antenna forward of the bulge and a portion of the second cellular antenna rearward of the bulge.

7. The multiband vehicle rooftop antenna assembly of claim 1, wherein the first satellite antenna is right hand circularly polarized and wherein the second cellular antenna is left hand circularly polarized.

8. The multiband vehicle rooftop antenna assembly of claim 1, wherein a feed of the second cellular antenna is positioned a first distance from a feed of the first satellite antenna and the feed of the second cellular antenna is positioned a second distance from a feed of the second satellite antenna, the first distance being less than the second distance.

9. The multiband vehicle rooftop antenna assembly of claim 1, wherein the V2X antenna is positioned rearward of the first cellular antenna, the first cellular antenna is positioned rearward of the first satellite antenna, the first satellite antenna is positioned rearward of the second cellular antenna, and the second cellular antenna is positioned rearward of the second satellite antenna.

10. The multiband vehicle rooftop antenna assembly of claim 1, wherein the first cellular antenna forms a rearward facing reflector, the V2X antenna located rearward of the first cellular antenna such that the rearward facing reflector increases gain of the V2X antenna in a generally rearward direction.

11. The multiband vehicle rooftop antenna assembly of claim 1, wherein the first cellular antenna includes a base including a feed, the first cellular antenna including a first branch extending from the base, the first branch defines a low-band radiator operating in low-band frequencies, the first cellular antenna including a second branch extending from the base, the second branch defines a mid-band radiator operating at mid-band frequencies above the low-band frequencies, the first cellular antenna including a third branch extending from the base, the third branch defines a high-band radiator operating at high-band frequencies above the mid-band frequencies, the first cellular antenna including a fourth branch extending from the base, the fourth branch defines an ultra-high-band radiator operating at ultra-high-band frequencies above the high-band frequencies, wherein the first branch, the second branch, the third branch, and the fourth branch are separated from each other by gaps.

12. The multiband vehicle rooftop antenna assembly of claim 11, wherein the first branch has a first length from the feed to a first branch tip, the second branch has a second length from the feed to a second branch tip, the third branch has a third length from the feed to a third branch tip, and the fourth branch has a fourth length from the feed to a fourth branch tip, the third length being longer than the fourth length, the second length being longer than the third length, and the first length being longer than the second length.

13. The multiband vehicle rooftop antenna assembly of claim 11, wherein the second branch is at a left side of the first branch and the third branch is at a right side of the first branch, the second branch being angled relative to the first branch such that the second branch is non-parallel to the first branch, the third branch being angled relative to the first branch such that the third branch is non-parallel to the first branch.

14. The multiband vehicle rooftop antenna assembly of claim 11, wherein the first branch includes a bottom portion, a top portion, and an intermediate portion between the bottom portion and the top portion, the bottom portion extending generally perpendicular to the ground plane, the top portion extending generally parallel to the ground plane, the intermediate portion being angled relative to the top portion and the bottom portion such that the intermediate portion is non-parallel to the bottom portion and non-parallel to the top portion, the intermediate portion extending rearwardly from the bottom portion, the top portion extending forwardly from the intermediate portion.

15. The multiband vehicle rooftop antenna assembly of claim 1, wherein the second cellular antenna includes a base including a feed, the second cellular antenna including a first branch extending from the base, the first branch defines a low-band radiator operating in low-band frequencies, the first cellular antenna including a second branch extending from the base, the second branch defines an ultra-high-band radiator operating at ultra-high-band frequencies above the low-band frequencies.

16. The multiband vehicle rooftop antenna assembly of claim 15, wherein at least one of the first branch and the second branch define a mid-band radiator operating at mid-band frequencies above the low-band frequencies, and at least one of the first branch and the second branch define a high-band radiator operating at high-band frequencies above the mid-band frequencies.

17. The multiband vehicle rooftop antenna assembly of claim 15, wherein the second cellular antenna includes a dielectric support for antenna elements of the second cellular antenna, the dielectric support including a bottom side, a top side, a front side, a rear side, a right side, and a left side, the feed and the base of the second cellular antenna being provided at the left side, the first branch including a first portion extending along the front side between the left side and the right side, the first branch including a second portion extending from the first portion, the second portion being located along the right side, the first branch including a third portion extending from the second portion, the third portion extending along the top side.

18. The multiband vehicle rooftop antenna assembly of claim 17, wherein the first branch follows a generally spiral shaped left hand polarized path from the base along the first portion, the second portion, and the third portion to a first branch tip remote from the feed.

19. The multiband vehicle rooftop antenna assembly of claim 18, wherein the base extends generally forwardly from the feed to the first portion along the left side, wherein the first portion extends generally upwardly from the base to the second portion across the front side, wherein the second portion extends generally upwardly and rearwardly from the second portion to the third portion across the right side, and wherein the third portion extends generally rearwardly along the top side from the second portion to a first branch tip.

20. A multiband vehicle rooftop antenna assembly for installation to a rooftop of a vehicle, the multiband vehicle rooftop antenna assembly comprising:
 an antenna housing having a base and a radome coupled to the base such that an interior enclosure is collectively defined by the radome and the base, the radome having a ridge extending from a nose at a front of the radome to a tip at a rear of the radome, the tip being at an elevated height compared to the nose, the radome having a tail extending between the tip and the base at the rear of the radome;
 a first cellular antenna disposed within the interior enclosure, the first cellular antenna configured to be operable over one or more cellular frequencies;
 a second cellular antenna disposed within the interior enclosure, the second cellular antenna configured to be operable over one or more cellular frequencies;
 a first satellite antenna disposed within the interior enclosure, the first satellite antenna configured to be operable over one or more satellite frequencies, the first satellite antenna configured to be operable for receiving Global Navigation Satellite System (GNSS) signals;
 a second satellite antenna disposed within the interior enclosure, the second satellite antenna configured to be operable over one or more satellite frequencies, the second satellite antenna configured to be operable for receiving satellite digital audio radio services (SDARS) signals; and
 a V2X antenna disposed within the interior enclosure, the V2X antenna configured to be operable over Dedicated Short Range Communication (DSRC) frequencies, wherein the V2X antenna is located at the rear of the antenna housing between the first cellular antenna and the tail, the first cellular antenna forming a rearward facing reflector positioned relative to the V2X antenna to increase gain of the V2X antenna in a generally rearward direction.

21. The multiband vehicle rooftop antenna assembly of claim 20, wherein the tail is concave having bulge extending into the interior enclosure to form an upper pocket and a lower pocket, the first cellular antenna extending into the upper pocket above the bulge, the V2X antenna located below the bulge in the lower pocket.

22. The multiband vehicle rooftop antenna assembly of claim 20, wherein the first cellular antenna includes a base including a feed, the first cellular antenna including a first branch extending from the base, the first branch defines a low-band radiator operating in low-band frequencies, the first cellular antenna including a second branch extending from the base, the second branch defines a mid-band radiator operating at mid-band frequencies above the low-band frequencies, the first cellular antenna including a third branch extending from the base, the third branch defines a high-band radiator operating at high-band frequencies above the mid-band frequencies, the first cellular antenna including a fourth branch extending from the base, the fourth branch defines an ultra-high-band radiator operating at ultra-high-band frequencies above the high-band frequencies, wherein the first branch forms a reflector located at least partially above the V2X antenna, the second branch forms a reflector generally at a left side of the V2X antenna, and the third branch forms a reflector generally at a right side of the V2X antenna.

23. The multiband vehicle rooftop antenna assembly of claim 22, wherein the second branch is at a left side of the first branch and the third branch is at a right side of the first branch, the second branch being angled relative to the first branch such that the second branch is non-parallel to the first branch and angled inward toward the V2X antenna, the third branch being angled relative to the first branch such that the third branch is non-parallel to the first branch and angled inward toward the V2X antenna.

24. The multiband vehicle rooftop antenna assembly of claim 11, wherein the first branch includes a bottom portion, a top portion, and an intermediate portion between the bottom portion and the top portion, the bottom portion extending generally perpendicular to the ground plane, the top portion extending generally parallel to the ground plane, the intermediate portion being angled relative to the top portion and the bottom portion such that the intermediate portion is non-parallel to the bottom portion and non-parallel to the top portion, the intermediate portion extending rearwardly from the bottom portion and angled downward toward the V2X antenna, the top portion extending forwardly from the intermediate portion.

25. A multiband vehicle rooftop antenna assembly for installation to a rooftop of a vehicle, the multiband vehicle rooftop antenna assembly comprising:
 an antenna housing having a base and a radome coupled to the base such that an interior enclosure is collectively defined by the radome and the base, the radome having a ridge extending from a nose at a front of the radome to a tip at a rear of the radome, the tip being at an elevated height compared to the nose;
 a first cellular antenna disposed within the interior enclosure, the first cellular antenna configured to be operable over one or more cellular frequencies;
 a second cellular antenna disposed within the interior enclosure, the second cellular antenna configured to be operable over one or more cellular frequencies;
 a first satellite antenna disposed within the interior enclosure, the first satellite antenna configured to be operable over one or more satellite frequencies, the first satellite antenna configured to be operable for receiving Global Navigation Satellite System (GNSS) signals;
 a second satellite antenna disposed within the interior enclosure, the second satellite antenna configured to be operable over one or more satellite frequencies, the second satellite antenna configured to be operable for receiving satellite digital audio radio services (SDARS) signals; and a V2X antenna configured to be operable over Dedicated Short Range Communication (DSRC) frequencies;

wherein the second cellular antenna is located adjacent the first satellite antenna, the first satellite antenna being right hand circularly polarized and the second cellular antenna being left hand circularly polarized.

26. The multiband vehicle rooftop antenna assembly of claim 25, wherein a feed of the second cellular antenna is positioned a first distance from a feed of the first satellite antenna and the feed of the second cellular antenna is positioned a second distance from a feed of the second satellite antenna, the first distance being less than the second distance.

27. The multiband vehicle rooftop antenna assembly of claim 25, wherein the first cellular antenna is positioned rearward of the first satellite antenna, the first satellite antenna is positioned rearward of the second cellular antenna, and the second cellular antenna is positioned rearward of the second satellite antenna.

28. The multiband vehicle rooftop antenna assembly of claim 25, wherein the second cellular antenna includes a base including a feed, the second cellular antenna including a first branch extending from the base, the first branch defines a low-band radiator operating in low-band frequencies, the first cellular antenna including a second branch extending from the base, the second branch defines an ultra-high-band radiator operating at ultra-high-band frequencies above the low-band frequencies, wherein at least one of the first branch and the second branch define a mid-band radiator operating at mid-band frequencies above the low-band frequencies, and at least one of the first branch and the second branch define a high-band radiator operating at high-band frequencies above the mid-band frequencies.

29. The multiband vehicle rooftop antenna assembly of claim 28, wherein the first branch follows a generally spiral shaped left hand polarized path from the base along the first portion, the second portion, and the third portion to a first branch tip remote from the feed.

30. The multiband vehicle rooftop antenna assembly of claim 28, wherein the second cellular antenna includes a dielectric support for antenna elements of the second cellular antenna, the dielectric support including a bottom side, a top side, a front side, a rear side, a right side, and a left side, the feed and the base of the second cellular antenna being provided at the left side, the first branch including a first portion extending along the front side between the left side and the right side, the first branch including a second portion extending from the first portion, the second portion being located along the right side, the first branch including a third portion extending from the second portion, the third portion extending along the top side.

31. The multiband vehicle rooftop antenna assembly of claim 30, wherein the base extends generally forwardly from the feed to the first portion along the left side, wherein the first portion extends generally upwardly from the base to the second portion across the front side, wherein the second portion extends generally upwardly and rearwardly from the second portion to the third portion across the right side, and wherein the third portion extends generally rearwardly along the top side from the second portion to a first branch tip.

* * * * *